(12) United States Patent
Gödecke et al.

(10) Patent No.: US 8,174,145 B2
(45) Date of Patent: May 8, 2012

(54) POWER SUPPLY AND COMMUNICATIONS SYSTEM FOR A PASSENGER AIRCARFT

(75) Inventors: Rolf Gödecke, Hamburg (DE); Jean-Paul Moreaux, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 612 days.

(21) Appl. No.: 11/991,925

(22) PCT Filed: Sep. 13, 2006

(86) PCT No.: PCT/EP2006/066322
§ 371 (c)(1),
(2), (4) Date: Mar. 13, 2008

(87) PCT Pub. No.: WO2007/031538
PCT Pub. Date: Mar. 22, 2007

(65) Prior Publication Data
US 2009/0261651 A1 Oct. 22, 2009

(30) Foreign Application Priority Data
Sep. 15, 2005 (DE) .................. 10 2005 044 195

(51) Int. Cl.
*H04B 3/54* (2006.01)
(52) U.S. Cl. ............................ 307/3; 307/9.1
(58) Field of Classification Search .......... 307/1, 3, 307/4, 13, 9.1, 10.1; 340/310.18, 825.01, 340/310.11, 310.12, 310.16, 310.17
See application file for complete search history.

(56) References Cited

U.S. PATENT DOCUMENTS

| | | | | |
|---|---|---|---|---|
| 5,828,293 A | * | 10/1998 | Rickard | 375/257 |
| 5,977,650 A | * | 11/1999 | Rickard et al. | 307/3 |
| 6,154,488 A | * | 11/2000 | Hunt | 375/219 |
| 6,172,597 B1 | | 1/2001 | Brown | |
| 2001/0008391 A1 | | 7/2001 | Yuasa | |
| 2005/0063363 A1 | | 3/2005 | Lazar et al. | |

FOREIGN PATENT DOCUMENTS

| | | |
|---|---|---|
| DE | 100 61 585 | 7/2002 |
| DE | 102 09 597 | 9/2003 |
| GB | 2 180 381 | 3/1987 |
| JP | 2002-051403 A | 2/2002 |
| JP | 2004-354173 A | 12/2004 |

OTHER PUBLICATIONS

International Search Report dated Mar. 13, 2007.
German examination report dated Mar. 19, 2010 for DE 10 2005 044 195.5-35.
International Preliminary Report on Patentability mailed Apr. 17, 2008 in PCT/EP2006/066322.
Official Action in Japanese Patent Application No. 2008-530518.

* cited by examiner

*Primary Examiner* — Fritz M Fleming
(74) *Attorney, Agent, or Firm* — Jenkins, Wilson, Taylor & Hunt, P.A.

(57) ABSTRACT

The invention relates to a combined supply and communications system for transferring data between a data server and at least one of several terminal devices over a power supply cable wherein the data server and each of the several terminal devices are each connected to the power supply cable over an incoupling/decoupling unit.

In order to enable an optimum supply of consumers spread out around the aircraft both with electrical energy and with the desired communications resources and at the same time to minimize the cabling expense, the power supply cable comprises according to the invention at least four conductors wherein at least one conductor corresponds to a transfer channel in the downward direction and at least one conductor corresponds to a transfer channel in the upward direction.

16 Claims, 2 Drawing Sheets

POWER SUPPLY AND COMMUNICATIONS SYSTEM FOR A PASSENGER AIRCARFT

This application is the U.S. national phase of International Application No. PCT/EP2006/066322 filed 13 Sep. 2006 which designated the U.S. and claims priority to German Application No. 10 2005 044 195.5 filed 15 Sep. 2005, the entire contents of each of which are hereby incorporated by reference.

The invention relates generally to electric supply and data transfer systems and more particularly to a combined power supply and communications system for the electric supply and transfer of data to several terminal devices according to the preamble of claim 1 as well as a corresponding method for transferring data over a power supply cable. More particularly the invention is capable of use in an aircraft.

In US 2001/0008391 a powerline system is described in which data is transferred in parallel over a power supply line wherein the data is split up into several transfer channels and transferred by way of packets.

The powerline systems designed for long-range distribution according to the prior art are however not suitable for large amounts of data up to 1 Gbit/s, as occur for example for video-on-demand. Furthermore the known systems which are used in standard energy supply networks are not optimised in terms of efficiency of the resources used, i.e. the already existing cabling is used, and the line length is of secondary interest. The known technology methods are therefore not readily usable if the cabling expense has to be minimised, in order to save weight for example.

In WO 02 123688 A2 a combined data and power distribution network is described with which the wiring weight in the aircraft is to be reduced and with which practically all larger sections of the aircraft can be wired. This is reached in that data from several sensors which are spread out round the aircraft are collected at data nodes located at central points in the aircraft and are made available to several system controllers via a bus.

With this prior art the wiring expense is however still always very high since only the physical lines are brought together at one point but cable for the data and cable for the power supply still have to be laid out.

It is the object of the present invention to enable an optimum supply to consumers distributed around the aircraft both with electrical energy and with the desired communications resources and at the same time to minimize the cabling expense.

This is achieved according to the invention through the combined supply and communications system for several terminal devices according to claim 1 and through the method for transferring data over a power supply cable according to claim 8. Preferred embodiments of the invention form the subject of the dependent claims.

The invention is based on the idea of using as the supply cable for the combined supply of the seat unit a multi-core cable and more particularly a three-phase current cable with three phase conductors and a neutral conductor which preferably has a shield. The supply cable is looped through each of the several terminal devices and a modem is integrated in each terminal device with which data is fed into and lifted from the supply cable. At least one conductor of the cable thereby serves as the transfer channel in the upward direction and at least one conductor of the cable serves as the transfer channel in the downward direction. In particular two cables are used each for one transfer channel.

Accordingly the combined supply and communications system according to the invention for transferring data between a data server and at least one of several terminal devices over a power supply cable wherein the data servers and each of the several terminal devices are each connected to the power supply cable by way of an incoupling/decoupling unit, is characterised in that the power supply cable comprises at least four conductors wherein at least one conductor corresponds to a transfer channel in the downward direction and at least one conductor corresponds to a transfer channel in the upward direction.

The power supply cable preferably has a shield so that the data to be transferred can be modulated up to (high frequency) carrier frequencies. In particular the power supply cable is a three-phase current cable. Preferably the combined supply and communications system comprises a modulator/oscillator device for modulating the data up to a carrier frequency. These carrier frequencies are dynamically allocated to the transfer channels preferably through an allocating mechanism according to a predetermined pattern so that they are utilised to the full capacity depending on the requirements and the frequencies are used where necessary.

In a further preferred embodiment of the combined supply and communications system each one transfer channel comprises two lines. Alternatively each one transfer channel comprises one line and the shield.

The method according to the invention for transferring data between a data server and at least one of several terminal devices over a power supply cable wherein the data servers and each of the several terminal devices are each connected to the power supply cable by an incoupling/decoupling unit and wherein the power supply cable comprises at least four conductors, of which at least one conductor corresponds to one transfer channel in the downward direction and at least one conductor corresponds to one transfer channel in the upward direction, has the steps: selecting at least one transfer channel in the downward direction, dividing up the packet sequences for transfer over a transfer channel, transferring the packet sequences on the one transfer channel to at least one of the several terminal devices in a full duplex operation.

Preferred embodiments of the method according to the invention have one or—where technically possible—several of the following features:

- before transfer of data in the upward direction from one of the several terminal devices to the at least one data server over a transfer channel a check is made whether data is being transferred over the transfer channel from one of the other several terminal devices;
- data is transferred on the power supply cable in the upward direction from one of the several terminal devices to the at least one data server over the transfer channel when the one terminal device has received a transfer command;
- the transfer command is generated by the at least one data server;
- the data is transferred in the upward direction from one of the several terminal devices to the at least one data server over its own transfer channel;
- the transfer channel in the upward direction is dynamically allocated to the terminal device;
- the transfer channel in the upward direction is dynamically allocated to the terminal device according to the "direct sequence" method or the "frequency hopping" method;
- each one transfer channel comprises two lines;
- each one transfer channel comprises one conductor and one shield.

One advantage of the solution to the problem according to the invention is that the number of data lines required and thus their length and the thickness of the wiring bundles are reduced and the installation expense for example in aircraft cabins is lowered. The power distribution is undertaken through an optimised network cabling so that the distribution of the electrical power to the consumers is determined through a suitable network topology. The network topology can in turn take into account the additional distribution of the consumers in dependence on the data technology requirements. One result is the improved reliability of the total system of the consumers supplied with both electricity and technical data.

Further features and advantages of the invention are apparent from the following description of embodiments wherein reference is made to the single drawing attached.

The object of the invention is a system for distributing data over a supply cable for three-phase current so that one network is created for the simultaneous transfer of energy e.g. for the power supply of consumers and the high-speed data transfer with 10 Mbps or more.

Figure 1:
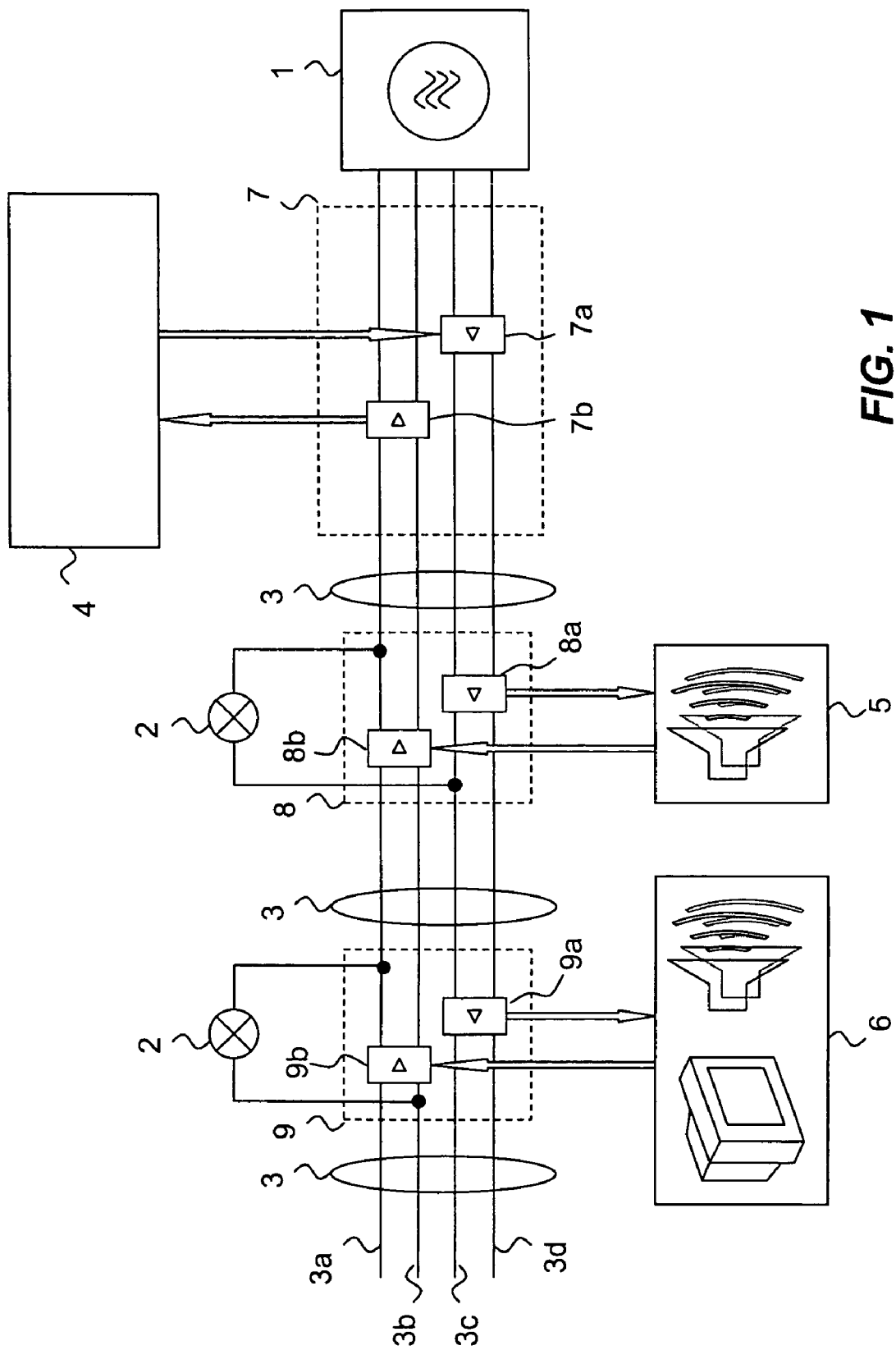
FIG. 1 shows diagrammatically a first embodiment of the combined supply and communications system according to the invention in which two conductors are used for one transfer channel.

The combined supply and data transfer system illustrated in FIG. 1 comprises at least one power supply 1 for the electrical supply of several consumers 2. Preferably this system is used in an aircraft (not shown). The consumers 2 are connected to the power supply 1 by a cable 3. This cable 3 is in the illustrated embodiment a three-phase current cable with a neutral conductor 3a and three phase conductors 3b, 3c and 3d. By way of example with the power supply cable 3 a voltage of 115 V is transferred with a frequency of up to 1 kHz. The current strength is by way of example 15 A maximum.

The supply and communications system comprises at least one data server 4 for storing communications data of and for the passengers wherein for reasons of clarity only one server is illustrated. In the following we proceed from the fact that the passengers each have at their seat one terminal device 5 and 6 respectively via which they can use entertainment and information programs on board the aircraft. The individual terminal devices are integrated into each seat and are designed in particular for playing back audio signals or video and audio signals, as indicated in FIG. 1 with the device 5 and 6 respectively. Thus the device 5 is designed for the replay of audio data whilst the device 6 is set up for both audio data and for video data. It is furthermore possible that the terminal devices comprise input units via which the passenger can communicate with the onboard entertainment system, by way of example to express a program request, or to establish a radio connection to outside of the aircraft. The one or the several terminal devices can also be portable devices of the passenger and are connected to the communications network of the aircraft via an interface (not shown) in the seat.

The power supply cable 3 connects the several terminal devices 5, 6 to the power supply 1. Furthermore it supplies several transfer channels via which communications data is transferred between the data server 4 and the terminal devices 5, 6.

In detail data is modulated up from the data server 4 via a server coupling unit 7 with the modem units 7a and 7b to the lines 3a, 3b, 3c and 3d of the power supply cable 3. The coupling unit 7a thereby serves to transfer data in the downward direction, i.e. from the server 4 over the line pair 3a, 3b to the terminal device 5 and 6 respectively. The coupling unit 7b on the other hand serves to receive data which is sent from the terminal devices 5, 6 in the upward direction to the server 4. The connection between the server 4 and the coupling unit 7a for the downward transfer of data from the server 4 to the terminal devices 5 and 6 respectively is shown by an arrow in the direction from the server 4 to the line 3c and 3d, the connection between the server 4 and the coupling unit 7b for the upward transfer of data from the terminal devices 5, 6 respectively to the server 4 are shown by an arrow in the direction from the line 3a and 3b to the server 4.

On the other side of the power supply cable 3 in the terminal device 5 the consumer 2 is connected to the neutral conductor 3a and one phase 3c of the power supply cable 3. Furthermore in a decoupling unit 8 of the terminal device 5 the data required for playing back the entertainment or information program selected by the passenger is decoupled through a modem unit 8a on the downward channel 3c, 3d. Data which is to be sent from the terminal device 5 to the server 4 is modulated up via the modem unit 8b to a corresponding upward channel, i.e. the line pair 3a and 3b.

Analogically in the terminal device 6 the consumer 2 is connected to the neutral conductor 3a and one phase 3b of the power supply cable 3. Furthermore in a decoupling unit 9 of the terminal device 6 the data which is required for playing back the entertainment or information program selected by the passenger is decoupled through a modem unit 9a on the downward channel 3c, 3d. At the terminal device 6 in addition to the first modem unit 9a there is additionally provided a further modem unit 9b which serves to transfer data from the terminal device 6 to the server 4.

The connections between the line pair 3c, 3d and the terminal devices 5 and 6 respectively for "downloading" data are shown as arrows in the direction of the terminal devices 5 and 6 respectively, the connections between the terminal device 6 and the line pair 3a, 3b for "uploading" data are shown as an arrow in the direction from the terminal device to the line pair 3a, 3b.

Basically the transfer channels can be divided up in any way into the power supply cable 3 as three-phase current cable with three phase conductors and one neutral conductor. This means that the two lines 3a, 3b and the two conductors 3c, 3d each form one line pair, but the lines 3a, 3c can however also form a first line pair and the lines 3b, 3d can form the second line pair etc. The person skilled in the art will optimize this accordingly during a concrete application of the invention.

Figure 2:
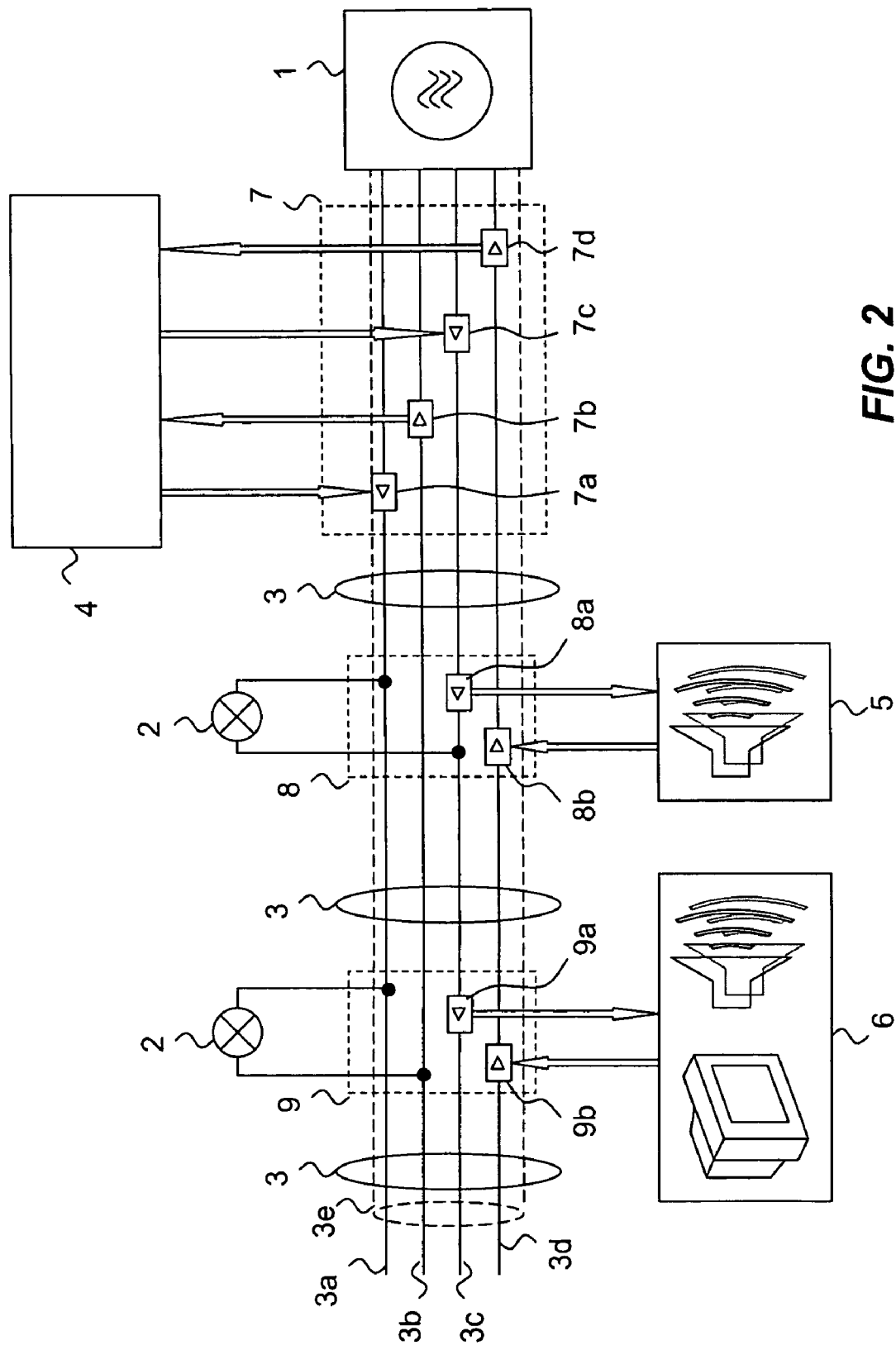
FIG. 2 shows diagrammatically a second embodiment of the combined supply and communications system according to the invention in which one conductor and the shield of the cable are used for each transfer channel.

It is however also possible that one conductor forms one transfer channel respectively. In this case the shield 3e of the cable is used as a counter pole of the data line. The shield 3e is shown semi-perspectively as a dotted cylinder in FIG. 2. The transfer over one conductor is to be explained below. Reference is thereby made to FIG. 2. In detail the data is modulated up from the data server 4 via a server coupling unit 7 with modem units 7a, 7b, 7c and 7d to at least one line from the lines 3a, 3b, 3c and 3d of the power supply cable 3. As already mentioned, each respective line is then one pole, and the other pole is the shield 3e. The corresponding coupling units, here 7a and 7c, thereby serve to transfer data in the downward direction, i.e. from the server 4 to the respective line 3 and to the one or more terminal devices 5, 6. The other coupling units, the coupling units 7b and 7d in the embodiment according to FIG. 2, serve on the other hand to receive data which is sent from the terminal devices 5, 6 in the upward direction to the server 4. The connections between the server 4 and coupling units 7a and 7c respectively for the downward transfer of data from the server 4 to the terminal devices 5 and 6 respectively are shown by an arrow in the direction of the lines 3a and 3c respectively, the connections between the server 4 and coupling units 7b and 7d respectively for the upward transfer of data from the terminal devices 5 and 6 respectively to the server 4 are shown by an arrow in the direction from the line 3a and 3c respectively to the server 4.

On the other side of the power supply cable 3 in the terminal device 5 the consumer 2 is connected to the neutral conductor 3a and one phase 3c of the power supply cable 3. Furthermore in a decoupling unit 8 of the terminal device 5 the data required for playing back the entertainment or information program selected by the passenger is decoupled through a modem unit 8a. Data which is to be sent from the terminal device 5 to the server 4 is modulated up by the modem unit 8b to a corresponding upward channel, i.e. the line 3d.

Analogically in the terminal device 6 the consumer 2 is connected to the neutral conductor 3a and one phase 3b of the power supply cable 3. Furthermore in a decoupling unit 9 of the terminal device 6 the data required for playing back the entertainment or information program selected by the passenger is decoupled through a modem unit 9a. At the terminal device 6 in addition to the first modem unit 9a there is additionally provided a further modem unit 9b which serves to transfer data from the terminal device 6 to the server 4.

The connections between the line 3c and the terminal devices 5 and 6 respectively for "downloading" data are shown as arrows in the direction of the terminal devices 5 and 6 respectively, the connections between the terminal device 6 and the line 3d for "uploading" data are shown as an arrow in the direction of line 3d.

The data is retrieved from the respective terminal device by one or by several lines 3a-3d. In the configuration illustrated in FIG. 2 audio data and video data are transferred over the line 3c. The terminal device 5, like the terminal device 6, retrieves the data from the line 3c. The conductors 3b and 3d serve to send data from the terminal devices to the server 4. Basically the transfer channels can be divided up on the power supply cable 3 as three-phase current cable with three phase conductors and a neutral conductor 3a-3d so that at least one conductor corresponds to an upward channel and at least one conductor corresponds to a downward channel. With a total of four lines in the cable the two remaining conductors can be fixedly allocated to a downward channel and an upward channel respectively, but they can however also be allocated dynamically according to requirements. Thus in the case where the data traffic from the terminal devices 5, 6 is light, three conductors can be reserved for the downward traffic and only one for the upward traffic. Should then several terminal devices 5, 6 register more demand for upward transfer the server 4 can stop the downward transfer on one of the three conductors and permit upward traffic thereon. This would mean that in some circumstances the data transfer rate in the downward direction is thereby slightly lowered.

The shield 3e actually serves to prevent radiation radiating through the power supply cable 3. It is therefore also possible to modulate the data to be transferred to carrier frequencies and thus to utilise each conductor or each pair of conductors for several transfer channels. The shield stops the undesired radiation of high frequencies to the lines 3a to 3d in the aircraft. Furthermore the shielded cable is drilled. With a wave resistance of about 100 Ω at least 10/100 Mbps can thus be transferred so that the cable is suitable as an Ethernet supply. With the use of carrier frequencies the number of effective transfer channels which are available for the transfer of data can be increased. The carrier frequencies can thereby be statically allocated or dynamically allocated to the transfer channels according to a predetermined pattern.

With a preferred embodiment (not shown) of the invention the data are transferred between the data server 4 and the or each of the modem units 7a and 7b or 7a-7d for incoupling or decoupling on the power supply cable 3 either through copper-based network lines or through fibre-optic conductors.

The modem units 7a and 7b or 7a-7d can transfer data to or receive data from the terminal devices in many ways. In the downward direction from the server 4 to the terminal devices 5, 6 the transfer takes place by way of example through the coupling units 7a and 7c in the full duplex method, since only the transmitter 7a or 7c respectively works in the downward direction from the server 4 to the decoupling units 8a, 9a.

In the upward direction there are three different possibilities of transfer, since basically several transmitters 8b and 9b can work in this direction. In the first case the transfer takes place in the genuine half-duplex method, i.e. the decoupling unit 8b, 9b checks the channel, thus here the line 3d, to see whether a transfer is already taking place over the channel. If this is the case, then the corresponding terminal device must wait until the channel is free. For this the state of the channel is interrogated—preferably at regular intervals. As soon as it is discovered that the channel is (again) free it can start up with its own transfer.

Alternatively the data is transferred in the upward direction in the quasi full duplex method. A control device (not shown) has control over the data traffic and allocates to individual terminal devices a time window in which they can transfer data to the server in the upward direction. When the time window is opened the decoupling unit 8b, 9b is informed through a corresponding control command from the control device or the server 4, and it can then start with the transfer of data.

As a further alternative the data can be transferred in the full duplex method. Each decoupling unit 8b, 9b sends on its own communications channel. The communications channel can correspond in particular to a carrier frequency which is statically or dynamically allocated to the channel. The dynamic allocating of the carrier frequency can take place by way of example according to the "direct sequence" method or the "frequency hopping" method.

The interface between the actual decoupling unit 8a, 8b, 9a, 9b and the terminal devices is preferably designed as Ethernet.

A combination of base band and carrier frequency-based transfer is possible wherein certain transfer modes are fixed and others are dynamically adapted. The control of the bidirectional transfer takes place over a full duplex stroke and/or over carrier frequencies; the distribution of data takes place hierarchically over heterogeneous physical media.

In the preferred embodiment of the invention each terminal device 5, 6 has an input connection and an output connection through which it is connected each time to a preceding and a following terminal device. The first terminal device is thereby obviously connected directly to the data server 4, the last terminal device is connected by its input connection to only the preceding terminal device. Since the power supply cable 3 is thus looped by each of the terminal devices 5 and 6, each terminal device is connected to the data server 4 and to the power source 1 (daisy chain).

For clarity in the figures only consumers 2 are shown which require one phase. Obviously it is however also possible to operate three-phase current consumers at the network, i.e.

consumers which are connected to all three phases 3b, 3c and 3d as well as to the neutral conductor 3a.

REFERENCE NUMERALS

1 Power supply
2 Electrical consumer
3 Power supply cable, 3a-3d conductors, 3e shield
4 Data server
5 Terminal device with one playback unit
6 Terminal device with two playback units
7 Incoupling unit, 7a-7d modem units
8 Decoupling unit, 8a modem unit
9 Decoupling unit, 9a, 9b modem units

The invention claimed is:

1. Combined supply and communications system comprising:
   a data server;
   a power supply;
   a plurality of terminal devices, wherein each of the plurality of terminal devices comprises an input connection and an output connection; and
   a power supply cable for transferring data between the data server and at least a first terminal device of the plurality of terminal devices and for distributing electrical power to at least the first terminal device, wherein the data server and each of the plurality of terminal devices are each connected to the power supply cable by an incoupling/decoupling unit, and wherein the power supply cable comprises:
      at least four conductors, wherein two conductors correspond to a transfer channel in the downward direction; and
      two other conductors correspond to a transfer channel in the upward direction;
      wherein the power supply cable connects to respective input and output connections of each of the plurality of terminal devices such that each terminal device within the plurality of terminal devices is connected to a preceding terminal device; and
      wherein the first terminal device connects directly to the data server and each of the remaining plurality of terminal devices connect to the data server and the power supply through the preceding terminal device.

2. Combined supply and communications system according to claim 1 in which the power supply cable further comprises a shield.

3. Combined supply and communications system according to claim 1 in which the power supply cable is a three-phase current cable.

4. Combined supply and communications system according to claim 1 with a modulator/oscillator apparatus for modulating up the data to a carrier frequency.

5. Combined supply and communications system according to claim 4, with an allocating mechanism for dynamically allocating carrier frequencies and transfer channels according to a predetermined pattern.

6. Combined supply and communications system according to claim 1 in which each transfer channel comprises two lines.

7. Combined supply and communications system according to claim 1 in which each transfer channel comprises one line and a shield.

8. Method for transferring data between a data server and at least a first terminal device of several terminal devices over a power supply cable and for distributing electrical power to at least the first terminal device of several terminal devices wherein the data server and each of the several terminal devices are connected to the power supply cable through an incoupling/decoupling unit and wherein the power supply cable comprises at least four conductors of which two conductors correspond to a transfer channel in the downward direction and two other conductors correspond to a transfer channel in the upward direction, said method comprising the steps of:
   connecting the power supply cable to respective input and output connections disposed on each of the several terminal devices, such that each terminal device of the several terminal devices is connected to a preceding device;
   connecting the first terminal device directly to the data server such that each of the remaining terminal devices of the several terminal devices connect to the data server and the power supply through the preceding terminal device;
   selecting at least one transfer channel in the downward direction;
   dividing up the data in packet sequences for transfer over the one transfer channel; and
   transferring the packet sequences on the one transfer channel to at least the first terminal device in a full duplex operation.

9. Method for transferring data over a power supply cable according to claim 8 in which prior to transfer of data in the upward direction from one of the several terminal devices to the at least one data server over a transfer channel a check is made to see whether data is being transferred over the transfer channel from one other of the several terminal devices.

10. Method for transferring data over a power supply cable according to claim 8 in which data is transferred in the upward direction from one of the several terminal devices to the at least one data server over the transfer channel on the power supply cable when the one terminal device has received a transfer request.

11. Method for transferring data over a power supply cable according to claim 10 in which the transfer request is generated by the at least one data server.

12. Method for transferring data over a power supply cable according to claim 8 in which the data is transferred in the upward direction from one of the several terminal devices to the at least one data server over its own transfer channel.

13. Method for transferring data over a power supply cable according to claim 12 in which the transfer channel is dynamically allocated in the upward direction to the terminal device.

14. Method for transferring data over a power supply cable according to claim 13 in which the transfer channel is dynamically allocated in the upward direction to the terminal device according to the "direct sequence" method or the "frequency hopping" method.

15. Method for transferring data over a power supply cable according to claim 8 in which each transfer channel comprises two lines.

16. Method for transferring data over a power supply cable according to claim 8 in which each one transfer channel comprises one line and a shield.

* * * * *